Oct. 31, 1961   C. E. WOOD   3,006,475
AUTOMATIC SOLIDS DISCHARGE VALVE FOR CLASSIFIERS
Filed Sept. 3, 1958   3 Sheets-Sheet 1
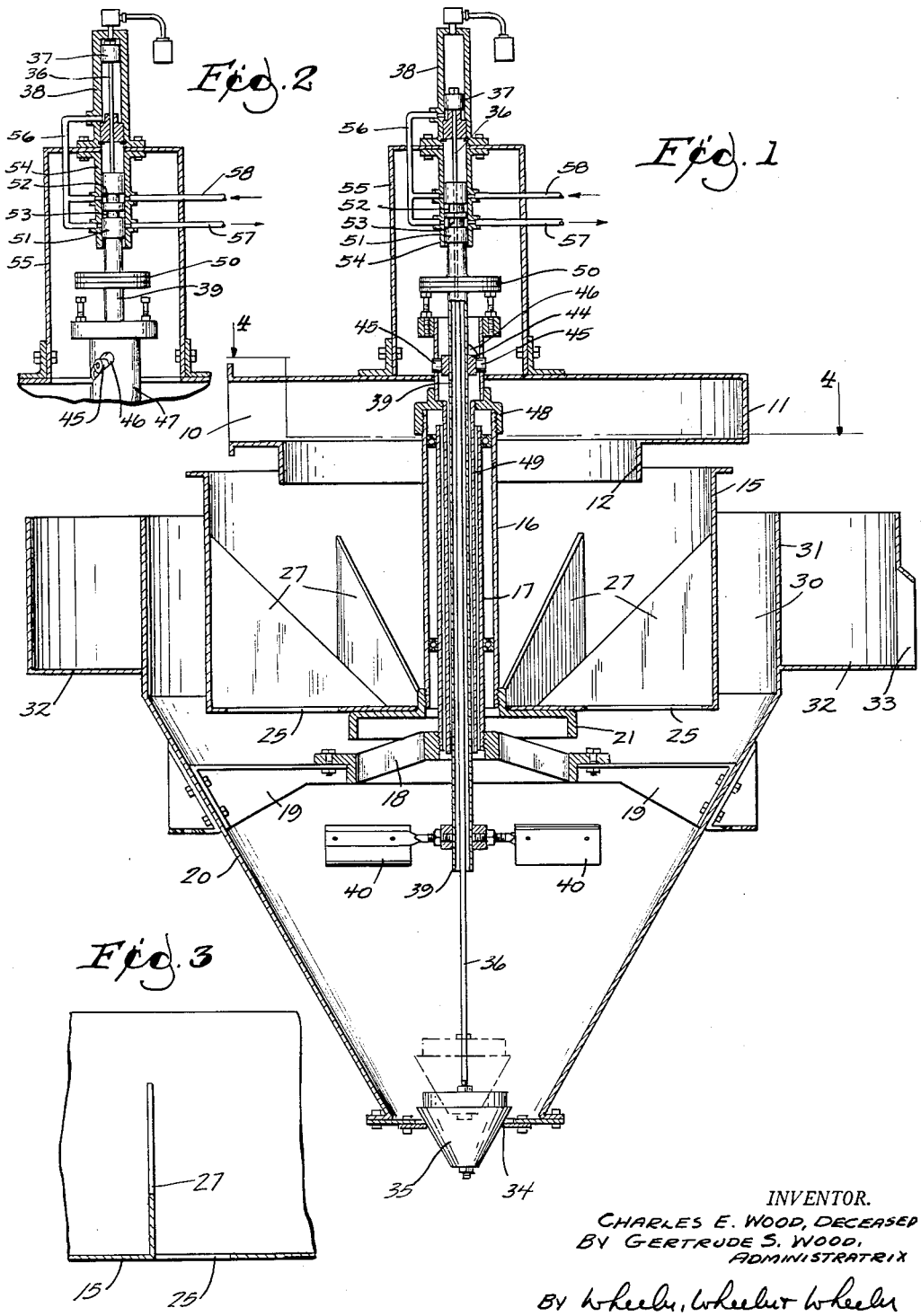
INVENTOR.
CHARLES E. WOOD, DECEASED
BY GERTRUDE S. WOOD,
ADMINISTRATRIX
BY Wheeler, Wheeler & Wheeler
ATTORNEYS

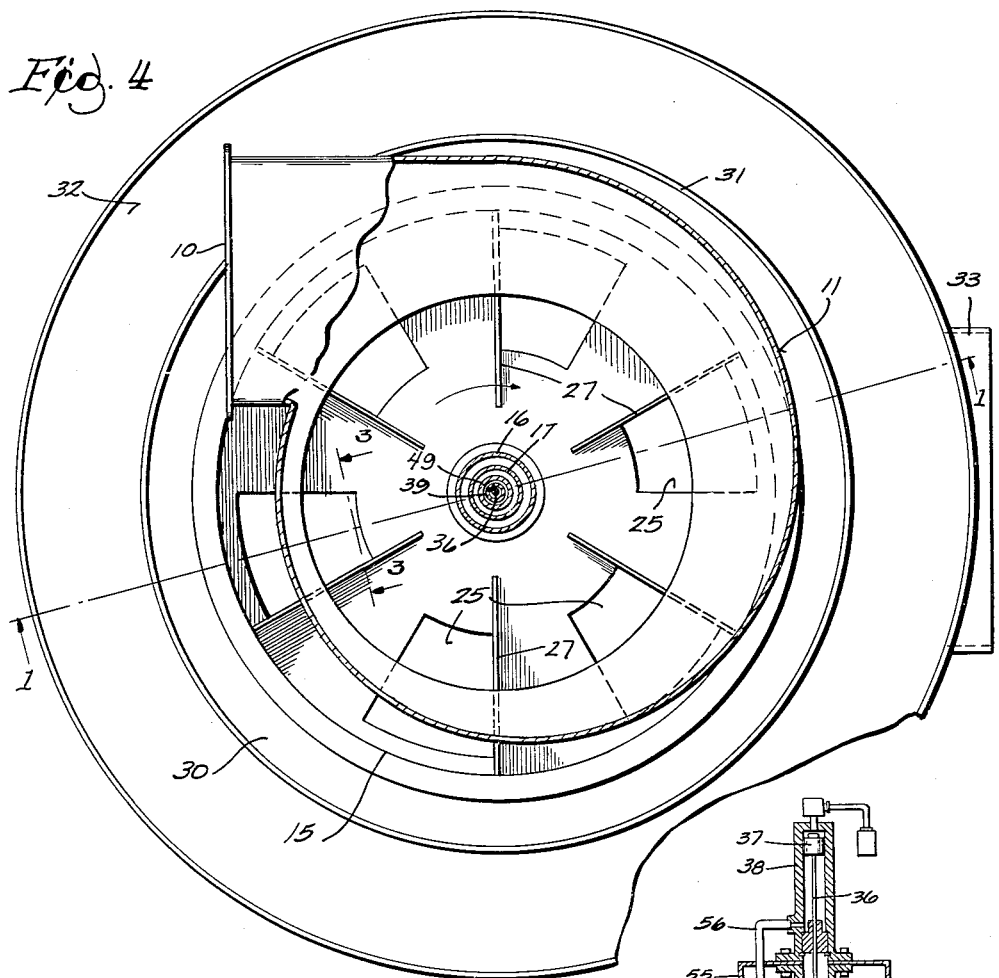
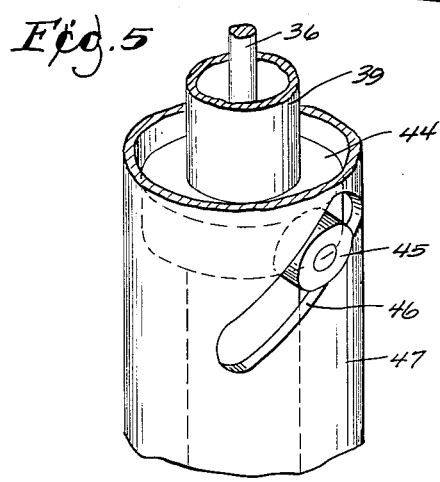
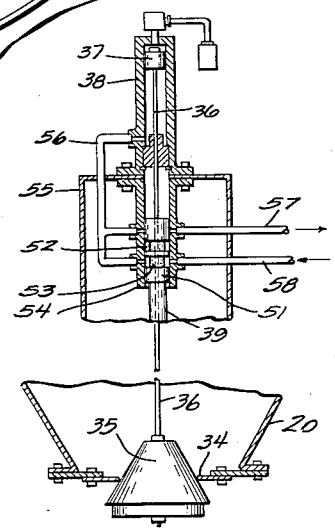

INVENTOR.
CHARLES E. WOOD, DECEASED
BY GERTRUDE S. WOOD,
ADMINISTRATRIX

BY Wheeler, Wheeler & Wheeler
ATTORNEYS

United States Patent Office 3,006,475
Patented Oct. 31, 1961

3,006,475
AUTOMATIC SOLIDS DISCHARGE VALVE FOR CLASSIFIERS
Charles E. Wood, deceased, late of Milwaukee, Wis., by Gertrude S. Wood, administratrix, Milwaukee, Wis., assignor of one-third each to Helen W. Aker, Hackensack, N.J., Jean W. Re, Pawling, N.Y., and Gertrude S. Wood, Milwaukee, Wis.
Filed Sept. 3, 1958, Ser. No. 758,722
12 Claims. (Cl. 210—112)

This invention relates to an automatic solids discharge valve for classifiers.

The invention is applicable both to cone and bowl type classifiers and both to classifiers in which the rotary parts are driven by a motor and those in which the rotary parts are driven by energy of the convection liquid.

The invention contemplates that the drive include a camming arrangement of such a nature that when there is an excess accumulation of solids the resistance thereof to the movement of a rotary part will react through the cam to open the valve. In the current-operated devices the cam acts through a servo-motor which controls the application of power from an auxiliary source, such as a hydraulic pressure connection, for lifting the valve until the reaction pressure is relieved by the discharge of solids from the classifier.

In the drawings:

FIG. 1 is a view in vertical axial section through a cone type classifier embodying the invention.

FIG. 2 is a fragmentary detail view similar to the upper portion of FIG. 1 but showing the parts in valve-opening position.

FIG. 3 is a fragmentary detail view taken in section on the line 3—3 of FIG. 4.

FIG. 4 is an enlarged view taken in section on the line 4—4 of FIG. 1.

FIG. 5 is an enlarged fragmentary detail view in perspective showing in section the driving parts which effect the camming operation of the servo-motor to the position shown in FIG. 2.

FIG. 6 is a fragmentary detail view showing a modified valve arrangement.

Figure 7:
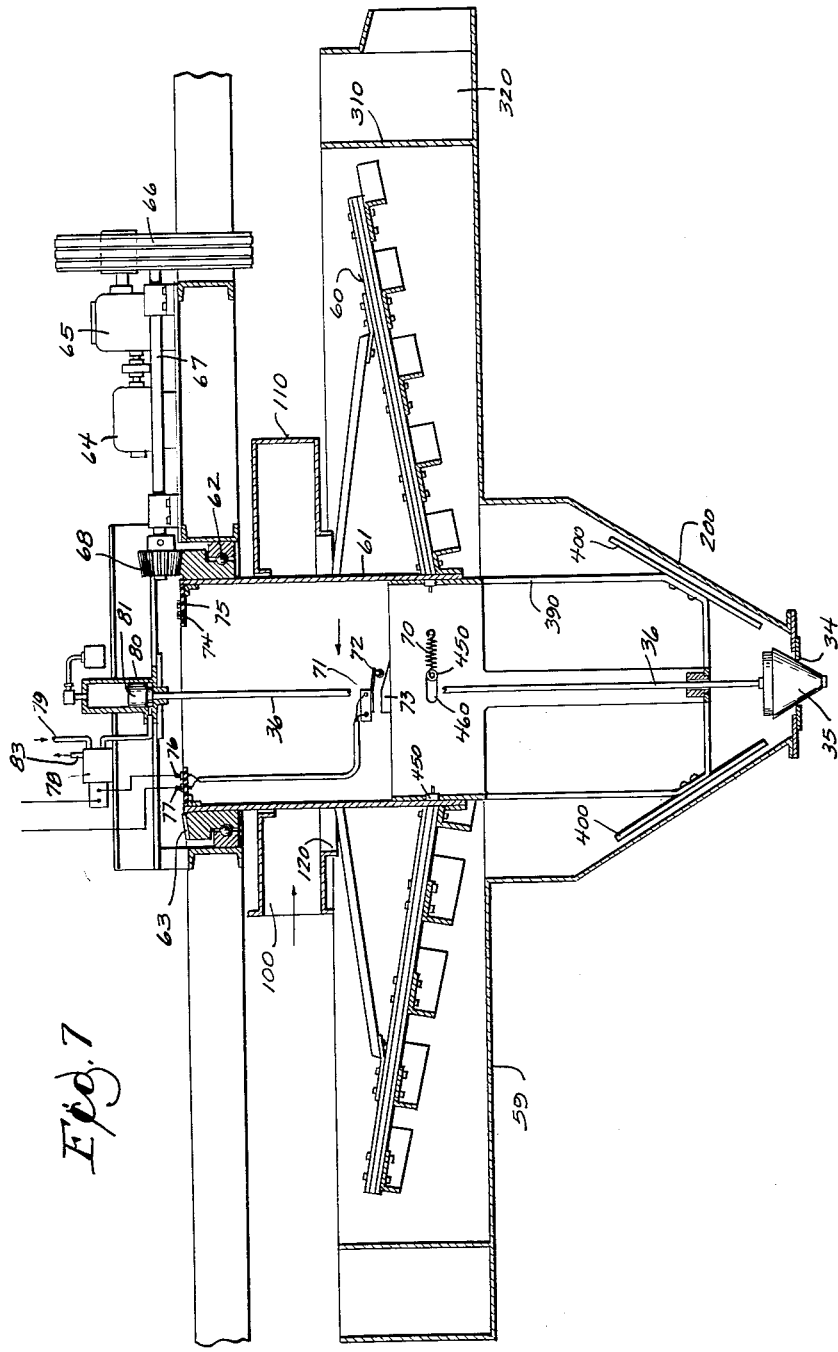
FIG. 7 is a view similar to FIG. 1 showing the invention applied to a bowl classifier.

The liquid carrier and entrained solids enter through the feeder spout 10 which is tangentially disposed with respect to the vortex chamber 11 to establish rotation in such chamber. The rotating liquids and solids fall through the port 12 into the cylinder 15 which has a hub portion 16 rotatably mounted on the tubular bearing column 17. The bearing column is supported by spider 18 and bracket arms 19 from the cone 20. The cylinder base 21, which is screw threaded or otherwise fastened to hub 16, supports the revolving cylinder 15. The cylinder 15 is provided with openings 25 in its bottom. As shown in FIG. 4, the cylinder rotates clockwise.

As the rotating material drops through the port 12 from the vortex chamber 11, the upstanding baffles 27 on the trailing edge of each of the openings 25 will lie in its path. The arrangement assures that the cylinder 15 will rotate clockwise with the vortex. It will be understood that the material comprising the vortex is constantly being discharged through the openings 25 into cone 20.

As the material is discharged into the cone 20, the solid content tends to fall to the bottom of the cone while the liquid content will rise in the annular sorting column 30 between the revolving cylinder 15 and an overflow weir 31 which constitutes an upward extension from the cone 20. Such liquid as overflows the weir is received into the overflow trough 32, from which it is discharged at 33.

In the bottom of cone 20 is a valve port 34 controlled by a plug valve 35 having a rod 36 extending upwardly through the classifier and connected at its upper end to an actuating piston 37 in cylinder 38.

Surrounding the valve rod 36 is a tubular shaft 39 called a bed-finder tube which carries at its lower end a set of bed-finder blades 40. The bed-finder tube is provided with a lifter pin hub 44 upon which are mounted cam rollers 45 disposed in the helical cam slots 46 of a sleeve 47 which is known as a valve lifter case. The valve lifter case is mounted on a cap 48 at the upper end of the hub 16 of the rotary cylinder 15 and serves to cover and protect the bearing column 17. The bearing column core 49 is suspended from the cap and provides clearance through the cap for the bed-finder tube 39.

There being no relatively fixed bed of solids at a low level in the cone 20, the bed-finder blades or vanes 40 will rotate relatively freely, being opposed as to rotation only by the liquids in the cone, which are also rotating. However, when a bed of solids accumulates in the cone to a depth such that the solids are encountered by the bed-finder blades or vanes 40, the rotation of the blades will meet with immediately increased resistance. In consequence of such resistance the reaction will cause the rollers 45 to ride up on the cam slots 46 to lift the bed-finder tube 39. This motion is utilized to effect the temporary opening of valve 35. However, inasmuch as the lifting of the bed-finder tube 39 also lifts the blades or vanes 40, the reaction pressure which caused the tube to lift is almost immediately relieved. Consequently the valve remains open only for very brief periods and then closes again pending further operation of the automatic control.

Instead of transmitting the valve-opening thrust directly from the lifting tube 39 to the valve (which would perhaps require more power than is available through the vortex), it is preferred to employ a servo-motor of any appropriate type to be actuated by the lifting of tube 39 and to effect valve-opening movement. In practice, the tube 39 is connected through a flexible coupling 50 with a spool valve 51 with axially spaced peripheral channels at 52 and 53. This valve operates in a valve casing 54 supported from the housing 55 on which the hydraulic cylinder 38 of the servo-motor is also carried. In the position of the parts as illustrated in FIG. 1, the lower channel 53 of the spool valve provides communication between the cylinder pipe 56 and a discharge pipe 57 so that there is no pressure in cylinder 38 below piston 37. Hydraulic or pneumatic pressure is available through the fluid pressure line 58.

In consequence of resistance to the rotation of the blades or vanes 40 upon accumulation of a bed of solids to the level of the blades in the cone 20, the reaction thrust will cause the cam rollers 45 to ride in the helical cam slots 46 to move the spool valve 51 to the position of FIG. 2, whereupon the upper channel 52 of the spool valve will provide communication between the fluid pressure supply pipe 58 and the cylinder pipe 56, whereby pressure developed in cylinder 38 below the piston 37 will raise the piston to the top of the cylinder, thereby lifting the rod 36 and the valve 35 at the lower end of such rod. Ordinarily a sufficient amount of solids will be discharged from the cone so that the blades or vanes 40 will again rotate freely with the rotating cylinder 15 when the valve closes. However, if the initial opening of the valve has not relieved the depth of the bed of solids in the cone sufficiently to clear the vanes, the valve opening operation will be repeated. until the vanes rotate freely. The same operation will, of course, occur when further accumulations of solids again raise the depth of the bed in the cone.

The arrangement shown in FIG. 6 is identical with that shown in FIG. 1 except that the valve 35 is inverted to open downwardly rather than upwardly. In this instance it is opened by its own weight and the pressure of the contents of the cone 20 and is held in its normally closed position by fluid pressure which is admitted beneath piston 37 whenever the spool valve 51 is in its lower position. The pressure and exhaust lines 58 and 57 are inverted from the position shown in FIG. 1 and FIG. 2 so that if and when the spool is raised by the action of the bed-finder blades 40 and the cam track 46 and follower 45, the resulting change of pressure will exhaust the fluid from cylinder 38 allowing the piston 37 and valve 35 to descend to the open valve position. Since the reaction against free rotation of the bed-finder is relieved, the spool valve 51 will descend to its normal position and pressure will be admitted from pipe 58 beneath piston 37 to close the valve.

In the bowl type classifier shown in FIG. 7, the liquid vehicle and entrained solids are supplied conventionally through the conduit 100 to the chamber 110, from which the material falls through the opening defined by flange 120 into the bowl 59. In the bowl there is a conventional rake 60 mounted for rotation on shaft 61 which is suspended on bearings 62 and provided with a gear 63 through which it is driven. Power may be supplied by a motor 64 through reducer 65, pulley 66, shaft 67 and pinion 68, meshing with gear 63.

The bed-finder used in connection with the bowl type classifier of FIG. 7 can be identical with that above disclosed but in order to illustrate some of the various other positions, a different arrangement is shown.

The bed-finder tube or shaft 390 telescopes in the sleeve shaft 61 and carries bed-finder blades 400 rotatable around the sides of the conical sump 200 with which bowl 59 is provided. The discharge port 34, valve 35 and valve rod 36 may be essentially as already described.

Rollers 450 on the inner periphery of the sleeve shaft 61 are engaged in slots 460 of the extension shaft or bed-finder tube 390 for the support of the latter. While the device may employ cam rollers and cam slots as already described, a different exemplification of the invention is shown to illustrate another of the numerous ways in which it can be carried out. Tension springs 70 normally hold the bed-finder tube 390 in an advanced position of rotation with respect to the sleeve shaft 61 which drives the rakes 60. However, when solids in the sump 200 accumulate to an extent sufficient to impede the free rotation of the blades 400, the resulting resistance overcomes the tension of springs 70 and permits the bed-finder tube 390 to lag somewhat behind the driving sleeve shaft 61 which carries the rakes. This relative angular displacement between the sleeve shaft 61 and its extension 390 may be used, if desired, to operate a servomotor for opening the valve, assuming that the power of the motor 64 is not deemed adequate for that purpose. As one way of accomplishing this, a microswitch 71 is mounted within the sleeve shaft 61 and it has an actuator 72 in the path of a cam 73 which is fixed to the upper margin of the extension shaft or bed-finder tube 390.

When relative angular displacement occurs in opposition to the bias of the spring 70, as when the blades 400 encounter a bed of solids in the cone 200, the switch 71 closes a circuit through the commutator rings 74, 75 and brushes 76, 77 to energize a solenoid valve 78 which admits liquid under pressure from the supply line 79 to the cylinder 80 to raise therein the piston 81 at the upper end of the valve rod 36, thereby opening the valve. When the resistance to the blades 400 is eliminated, the bias of the spring or springs 70 will restore the normal angular relationship between the bed-finder tube 390 and the sleeve shaft 61, thereby disengaging the switch actuator 72 from the cam 73 and opening the circuit to the solenoid valve 78. This discharges through the pipe 83 the pressure in cylinder 80 thus allowing valve 35 to seat again until renewing accumulations in the cone sump 200 re-establish the conditions which will reopen the valve.

Thus in both types of classifier a discharge valve is automatically opened and closed for the discharge of excessive accumulations of solids and in both instances the closing occurs almost immediately so that little of the liquid comprising the convection current is discharged with the solids. In either case a servo-motor arrangement operated or controlled hydraulically, pneumatically or electrically may optionally be used, if desired, to provide the energy for opening the valve, assuming that some supplemental energy supply is required over and beyond that available in normal operation of the classifier. In both instances, a bed-finder detects excessive accumulations of solids, the bed-finder being mounted for rotation with a rotor and biased angularly to a position which is normally rotatively advanced with respect to the rotor and from which position it is yieldable to actuate one of the relatively movable parts which controls the servomotor. Both hydraulic and electrical means are disclosed and in each instance the servo-motor is hydraulically powered in a valve-opening direction and moves by gravity in a valve-closing direction as the control valve places the hydraulic cylinder in communication respectively with a source of fluid under pressure and an exhaust port.

What is claimed is:

1. In a classifier having a receptacle in which liquid-entrained solids accumulate and which is provided with a discharge port and a valve therefor, means for automatically opening the valve when a predetermined accumulation of solids occurs in such receptacle, said means comprising a valve rod, a bed-finder mounted for rotation in the receptacle where solids accumulate, a rotor driven by flow of liquid and having a yieldable driving connection with the bed-finder, the bed-finder being biased toward advanced position in the direction of its rotation respecting said rotor and means for opening the valve upon the yielding of the bed-finder respecting said rotor and in opposition to its said bias consequent upon encountering a bed of solid material in the receptacle.

2. In a classifier having a receptacle in which solids accumulate and which is provided with a discharge port and a valve therefor, means for automatically opening the valve when a predetermined accumulation of solids occurs in such receptacle, said means comprising a valve rod, a bed-finder mounted for rotation in the receptacle, a rotor having a yieldable driving connection with the bed-finder, the bed-finder being biased forwardly in the direction of its rotation respecting said rotor and means for opening the valve upon the yielding of the bed-finder respecting said rotor and in opposition to its said bias consequent upon encountering a bed of solid material in the receptacle, the valve-opening means including relatively movable parts respectively connected with the bed-finder and the rotor and operable in a direction to move a valve and energize a servo-motor upon the relative yielding of the bed-finder respecting the rotor.

3. The device of claim 2 in which said parts comprise cam surfaces and a complementary cam follower.

4. The device of claim 3 in which the servo-motor has a control valve and fluid pressure and exhaust connections, said valve being operatively connected to be opened and closed by reaction of said cam and cam follower.

5. The device of claim 3 in which the servo-motor has fluid pressure and exhaust connections and an electrical magnetically actuated valve controlling said connections, a supply circuit for said valve and a switch controlling said circuit and having an operative connection to be opened and closed by relative movement between the cam and cam follower.

6. A classifier for liquid-entrained solids and comprising a downwardly tapering receptacle having a discharge port and a valve controlling said port, a bed-finder mounted for rotation in the receptacle and provided with blades movable freely in the receptacle except when a bed of solids disposed therein is encountered, means for delivering into the classifier a current of liquid and entrained solids to be segregated in the classifier, the solids accumulated in the receptacle subject to discharge through said port under the control of said valve, a rotor driven by the current of liquid and the solids entrained therein and substantially concentric with the bed-finder and having a yieldable driving connection to the bed-finder, the bed-finder being biased toward a normally advanced position respecting the rotor and angularly yieldable from said position against said bias when said blades encounter solids in the receptacle, a servo-motor connected with the valve for the opening thereof and means operatively connected respectively with the rotor and bed-finder and having control connection with the servo-motor for causing the operation of the servo-motor in a valve-opening direction when the bed-finder yields respecting the rotor and for causing operation of the servo-motor in a valve-closing direction when the bed-finder is advanced by its bias toward said position.

7. The device of claim 6 in which the classifier is a cone-type classifier having a vortex chamber with a tangential conduit for the admission of a convection current and entrained solids to be operated therefrom, said vortex chamber having a generally axial discharge port for the vortex current established in said vortex chamber, said rotor comprising means in the path of the vortex current to drive said rotor from said current.

8. A classifier for liquid-entrained solids and comprising a downwardly tapering receptacle having a discharge port and a valve controlling said port, a bed-finder mounted for rotation in the receptacle and provided with blades movable freely in the receptacle except when a bed of solids disposed therein is encountered, means for delivering into the classifier a current of liquid and entrained solids to be segregated in the classifier, the solids accumulated in the receptacle subject to discharge through said port under the control of said valve, a rotor substantially concentric with the bed-finder and having a yieldable driving connection to the bed-finder, the bed-finder being biased toward a normally advanced position respecting the rotor and angularly yieldable from said position against said bias when said blades encounter solids in the receptacle, a servo-motor connected with the valve for the opening thereof and means operatively connected respectively with the rotor and bed-finder and having control connection with the servo-motor for causing the operation of the servo-motor in a valve-opening direction when the bed-finder yields respecting the rotor and for causing operation of the servo-motor in a valve-closing direction when the bed finder is advanced by its bias toward said position, the classifier comprising a bowl having said solids-accumulating receptacle at the bottom thereof, the rotor having rake means rotatable in the bowl and being provided with power connections for its rotation.

9. The device of claim 6 in which the valve opens downwardly from said port, said servo-motor including means for normally maintaining the valve in its closed position.

10. The device of claim 6 in which the valve opens upwardly from said port, said valve being normally biased toward its closed position.

11. The classifier of claim 6 in which the means for delivering the convection current into the classifier comprises a vortex chamber having a bottom discharge opening and the driving rotor comprises a cylinder having a ported bottom and internal baffles engaged by the vortex discharged from the vortex chamber.

12. The device of claim 11 in which the baffles extend generally radially of the cylinder bottom immediately behind respective openings and spaced substantially in advance of succeeding openings whereby to leave behind each baffle an extent of cylinder bottom upon which the vortex of convection current is received to drive the cylinder.

References Cited in the file of this patent

UNITED STATES PATENTS

| | | |
|---|---|---|
| 1,665,081 | Andrews | Apr. 3, 1928 |
| 2,069,553 | Mitchell | Feb. 2, 1937 |
| 2,491,801 | Debrey | Dec. 20, 1949 |
| 2,564,963 | Drigenko et al. | Aug. 21, 1951 |
| 2,588,115 | Hines | Mar. 4, 1952 |
| 2,754,260 | Butler | July 10, 1956 |

FOREIGN PATENTS

| | | |
|---|---|---|
| 697,714 | Great Britain | Sept. 30, 1953 |
| 762,719 | France | Jan. 29, 1934 |